(12) United States Patent
Lee

(10) Patent No.: US 7,083,198 B2
(45) Date of Patent: Aug. 1, 2006

(54) TILT STEERING APPARATUS FOR VEHICLE

(75) Inventor: Byeong-Hoon Lee, Kyunggi-do (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 322 days.

(21) Appl. No.: 10/649,896

(22) Filed: Aug. 28, 2003

(65) Prior Publication Data

US 2004/0251673 A1    Dec. 16, 2004

(30) Foreign Application Priority Data

Jun. 16, 2003    (KR) ...................... 10-2003-0038732

(51) Int. Cl.
  *B62D 1/18*    (2006.01)
  *B62D 1/184*   (2006.01)
  *B62D 1/187*   (2006.01)

(52) U.S. Cl. ........................................ 280/775; 74/493
(58) Field of Classification Search ................ 280/775; 74/493
  See application file for complete search history.

(56) References Cited

U.S. PATENT DOCUMENTS

| | | | | |
|---|---|---|---|---|
| 4,593,577 | A * | 6/1986 | Kinoshita | .................... 74/493 |
| 4,752,085 | A * | 6/1988 | Yamamoto | .................. 280/775 |
| 4,892,330 | A * | 1/1990 | Beauch | ........................ 280/775 |
| 4,903,540 | A   | 2/1990 | Beauch | |
| 5,035,446 | A * | 7/1991 | Arvidsson | ................... 280/775 |
| 5,078,022 | A   | 1/1992 | Ichikawa | |
| 5,143,402 | A   | 9/1992 | Higashino et al. | |
| 5,144,855 | A * | 9/1992 | Yamaguchi et al. | .......... 74/493 |
| 5,163,337 | A * | 11/1992 | Herron et al. | ................ 74/493 |
| 5,188,392 | A * | 2/1993 | Sugiki et al. | ............... 280/775 |
| 5,409,261 | A * | 4/1995 | Yamaguchi | ................. 280/775 |
| 5,419,215 | A * | 5/1995 | Herron et al. | ................ 74/493 |
| 5,452,624 | A   | 9/1995 | Thomas et al. | |
| 5,823,062 | A * | 10/1998 | Snell et al. | .................... 74/493 |
| 5,871,233 | A * | 2/1999 | Tanaka et al. | .............. 280/777 |

(Continued)

FOREIGN PATENT DOCUMENTS

JP    57142677    9/1982

(Continued)

OTHER PUBLICATIONS

English Language Abstract of JP11-268654.

(Continued)

*Primary Examiner*—Paul N. Dickson
*Assistant Examiner*—George D. Spisich
(74) *Attorney, Agent, or Firm*—Greenblum & Bernstein, p.L.C.

(57) ABSTRACT

A tilt steering apparatus for a vehicle includes a lower steering shaft of which the low end is mounted with a steering gear, an upper steering shaft of which the upper end is mounted with a steering wheel. A universal joint joins a top end of the lower steering shaft with a lower end of the upper steering shaft and a lower column member is fixed to a vehicle body to support the lower steering shaft to be moveable. An upper column member supports the upper steering shaft to be moveable and a tilt lock mechanism that tilt locks the upper column member to the lower column member is provided. The tilt lock mechanism includes a fixed gear attached to the lower column member and a moveable gear attached to the upper column member so as to be moveable. A female gear is provided on the upper column member and a feed screw bar is mounted to the female member to lock the moveable gear to the fixed gear by pressing the moveable gear.

8 Claims, 7 Drawing Sheets

U.S. PATENT DOCUMENTS

| | | | |
|---|---|---|---|
| 5,899,497 A * | 5/1999 | Spencer et al. | 280/775 |
| 5,915,726 A * | 6/1999 | Hibino et al. | 280/775 |
| 6,036,228 A * | 3/2000 | Olgren et al. | 280/775 |
| 6,272,945 B1 * | 8/2001 | Jolley | 74/493 |
| 6,282,977 B1 * | 9/2001 | Satoh et al. | 74/493 |
| 6,481,310 B1 | 11/2002 | Janeczko et al. | |

FOREIGN PATENT DOCUMENTS

| | | |
|---|---|---|
| JP | 63-12470 | 1/1988 |
| JP | 64-51567 | 3/1989 |
| JP | 3-112468 | 11/1991 |
| JP | 6-1110 | 1/1994 |
| JP | 08230687 | 9/1996 |
| JP | 63-52666 | 4/1998 |
| JP | 10138934 | 5/1998 |
| JP | 11129914 | 5/1999 |
| JP | 11198819 | 7/1999 |
| JP | 11208483 | 8/1999 |
| JP | 11268654 | 10/1999 |
| JP | 2000-272524 | 10/2000 |
| JP | 60144569 | 8/2003 |

OTHER PUBLICATIONS

English Language Abstract of JP11-208483.
English Language Abstract of JP11-109819.
English Language Abstract of JP11-129914.
English Language Abstract of JP10-138934.
English Language Abstract of JP08-230687.
English Language Abstract of JP2000-272524.

* cited by examiner

[FIG. 1] Prior Art
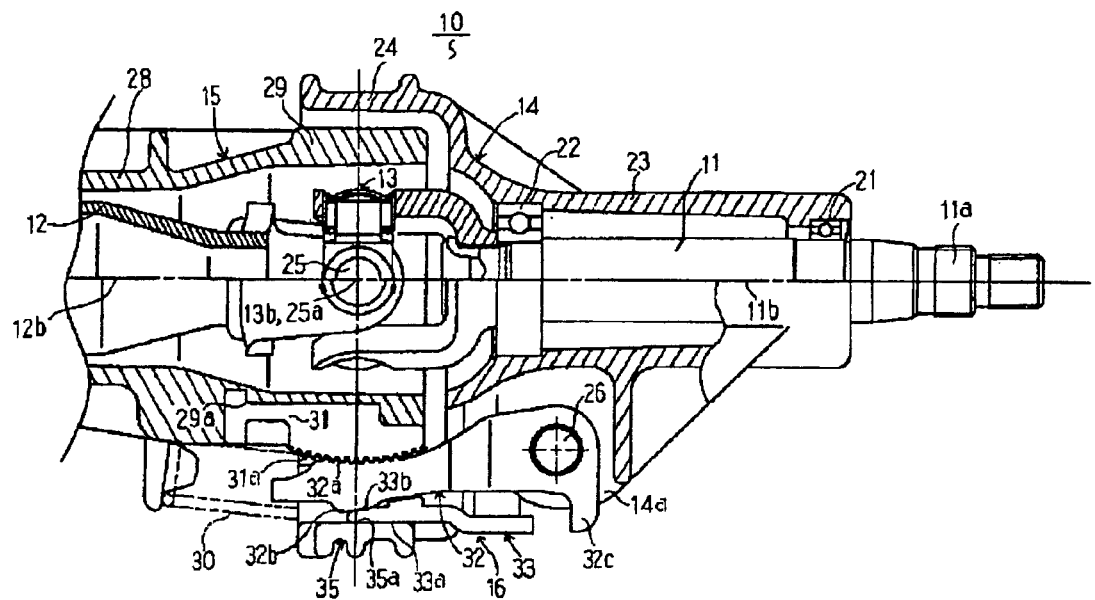
[FIG. 2] Prior Art
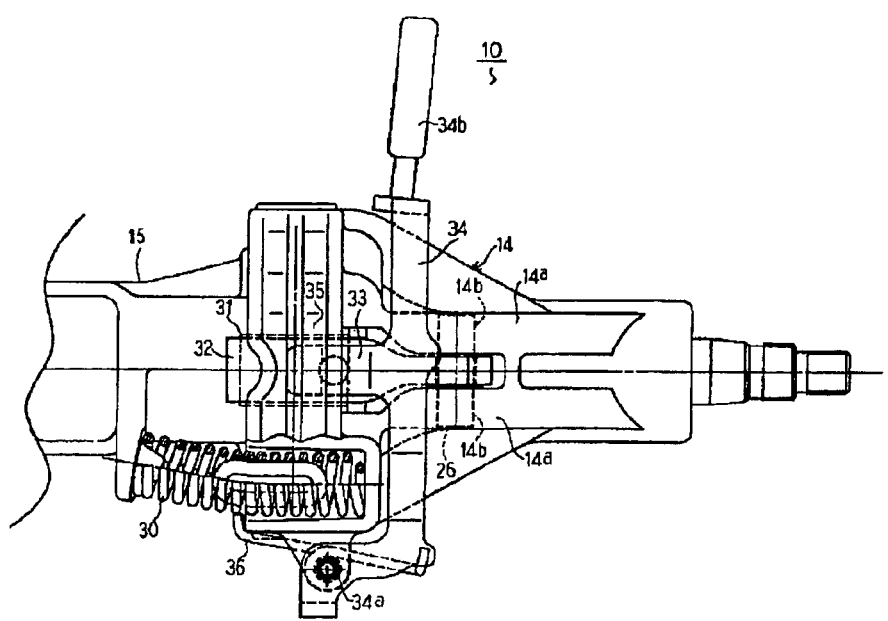

[FIG. 3] Prior Art
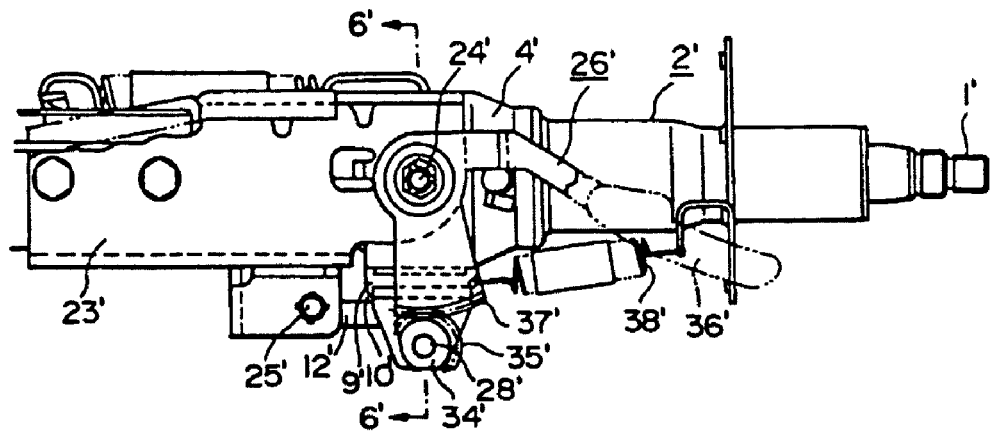
[FIG. 4] Prior Art
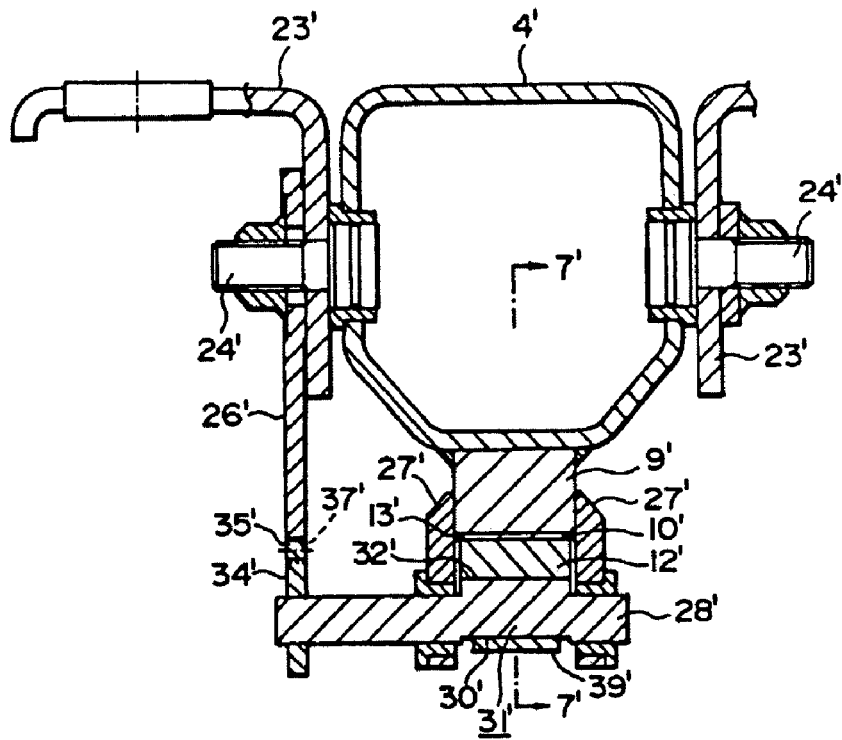

[FIG. 5]
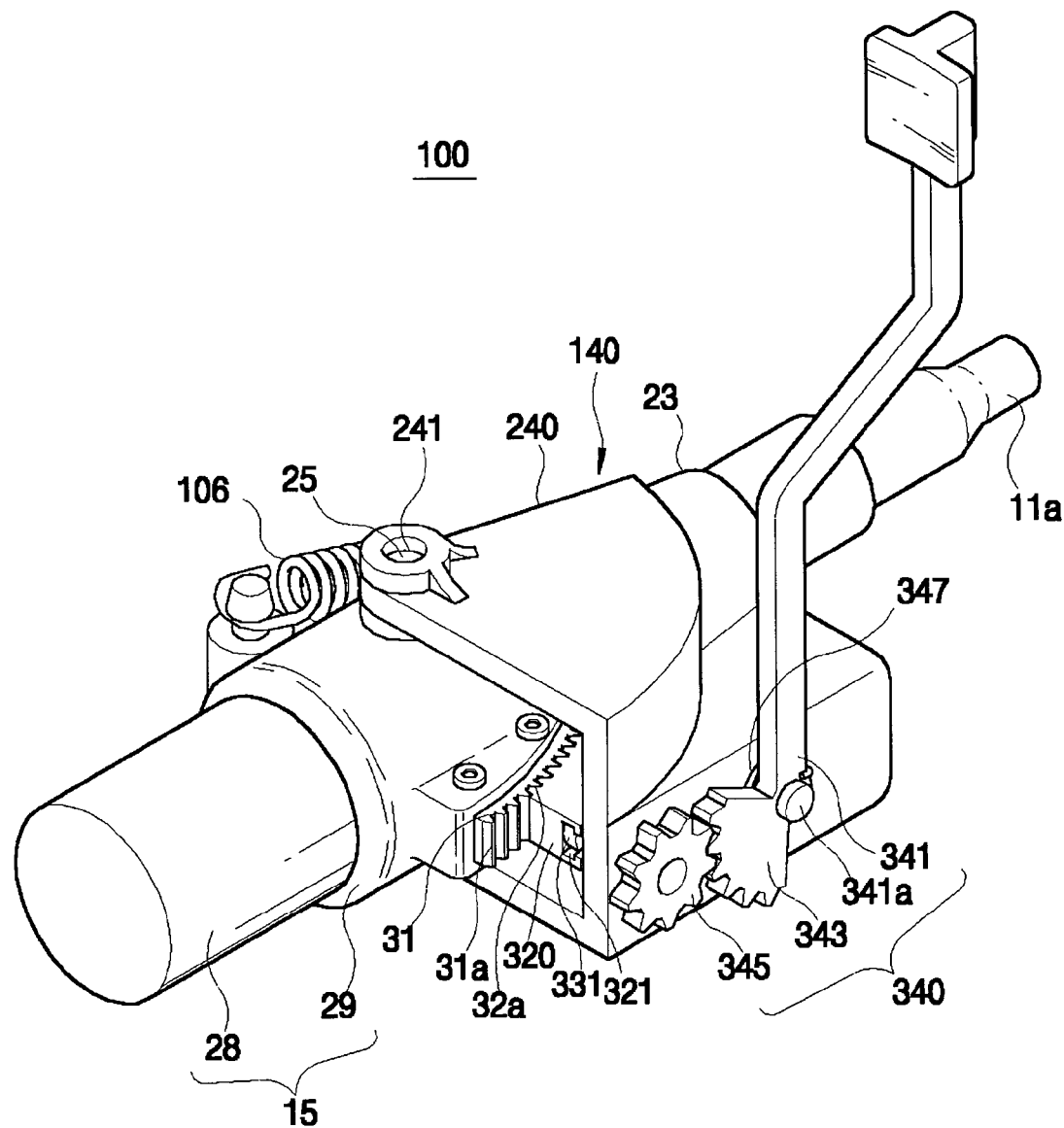

[FIG. 6]
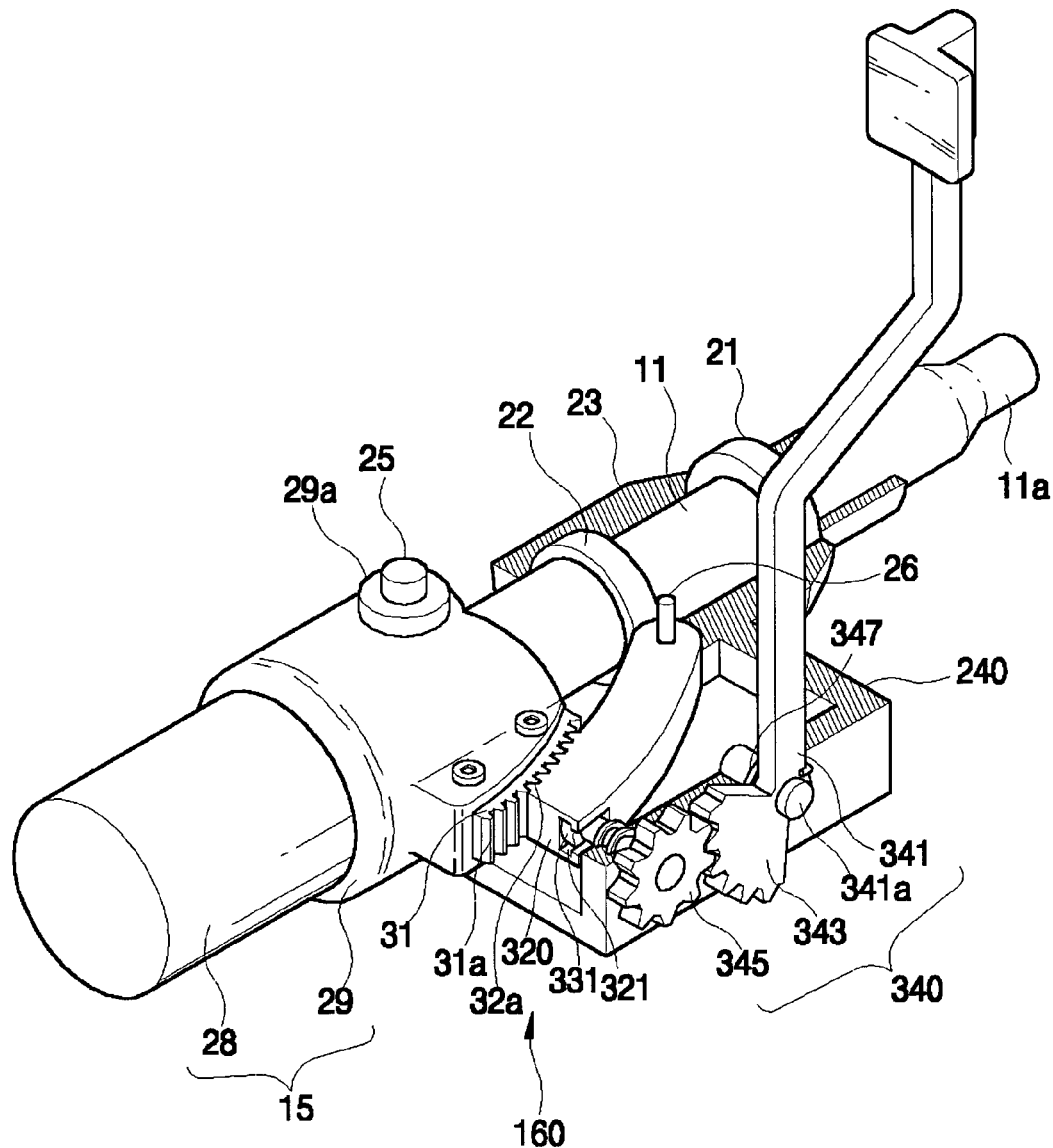

[FIG. 7]
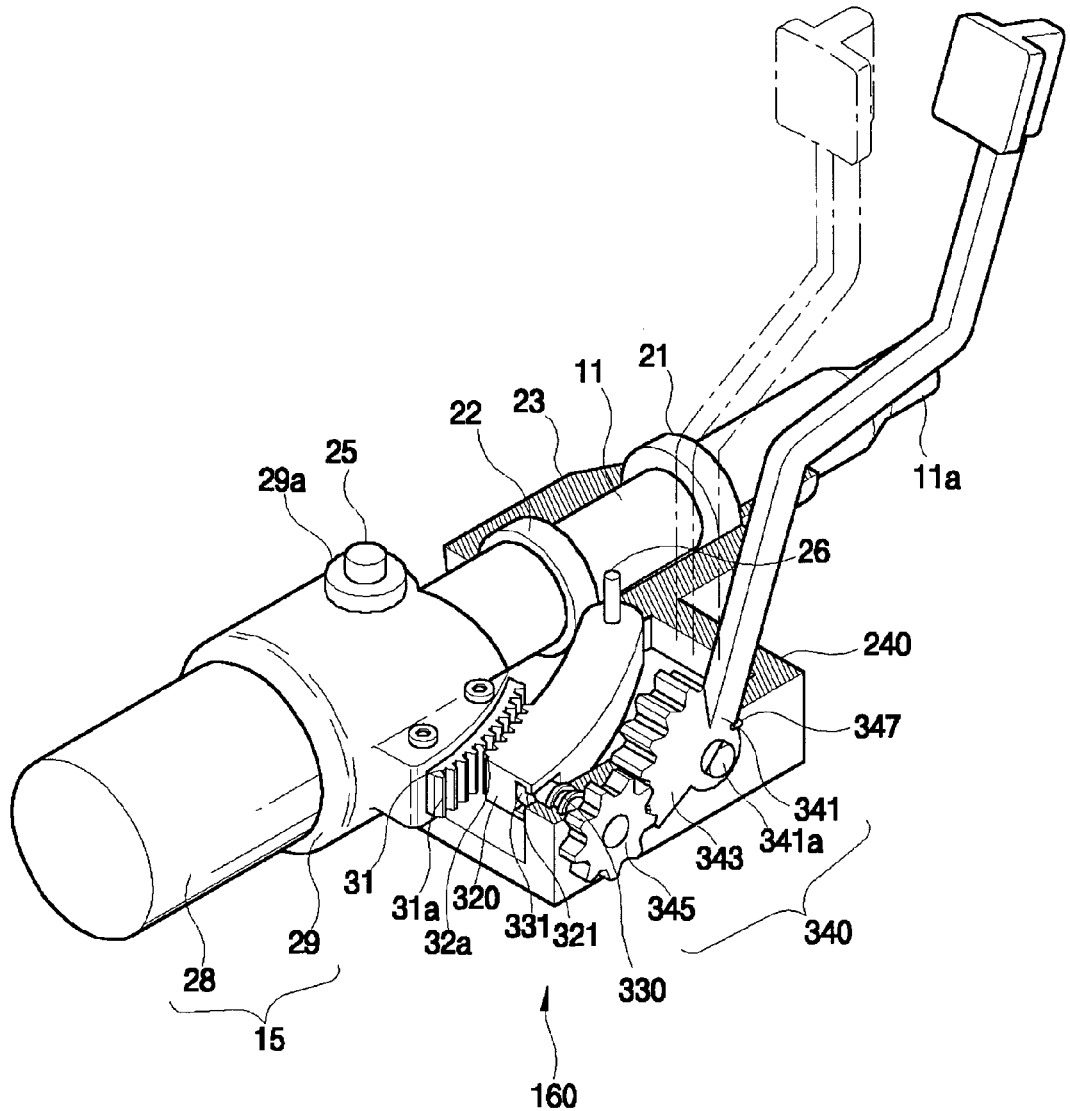

[FIG. 8]
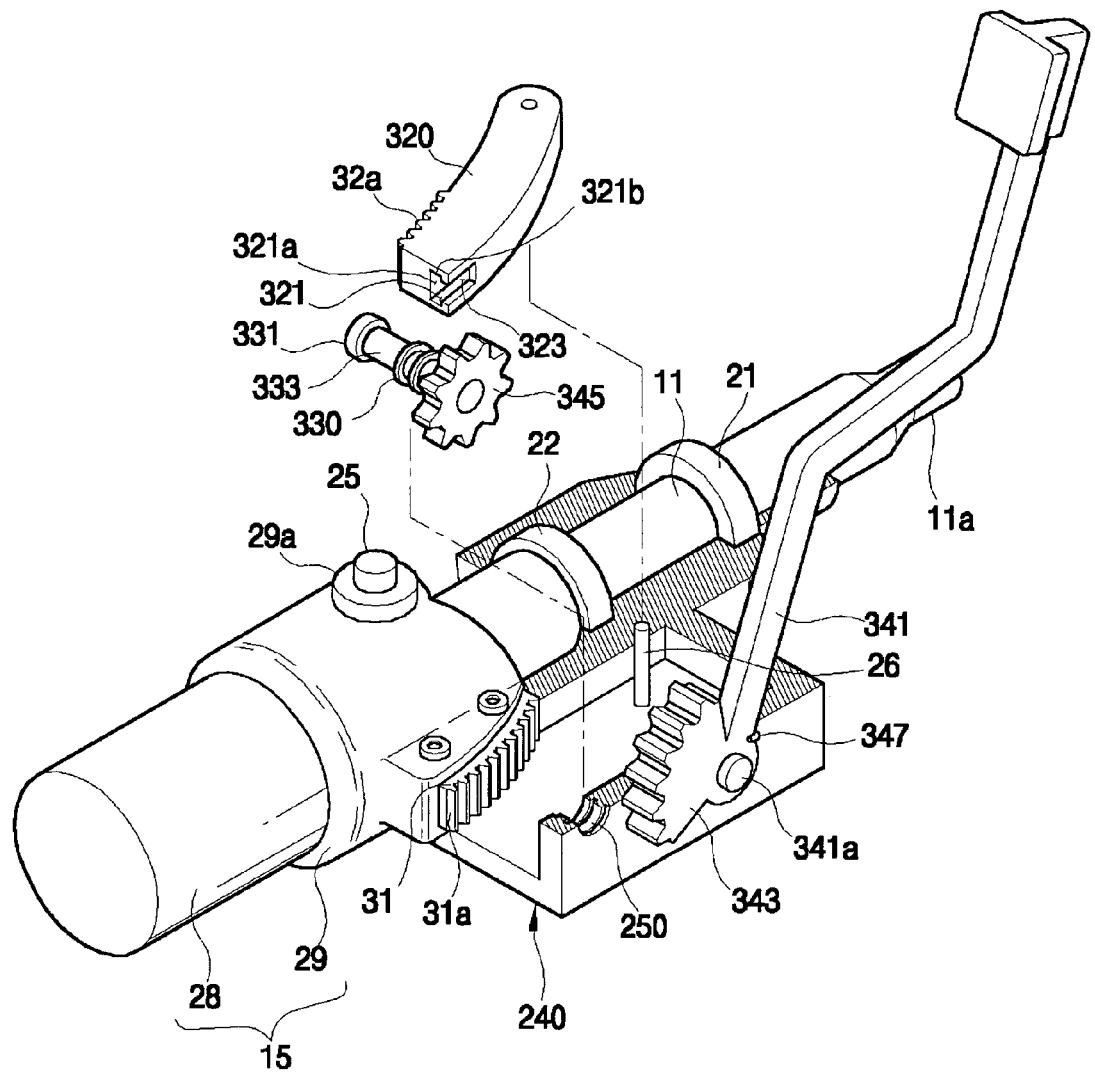

[FIG. 9]
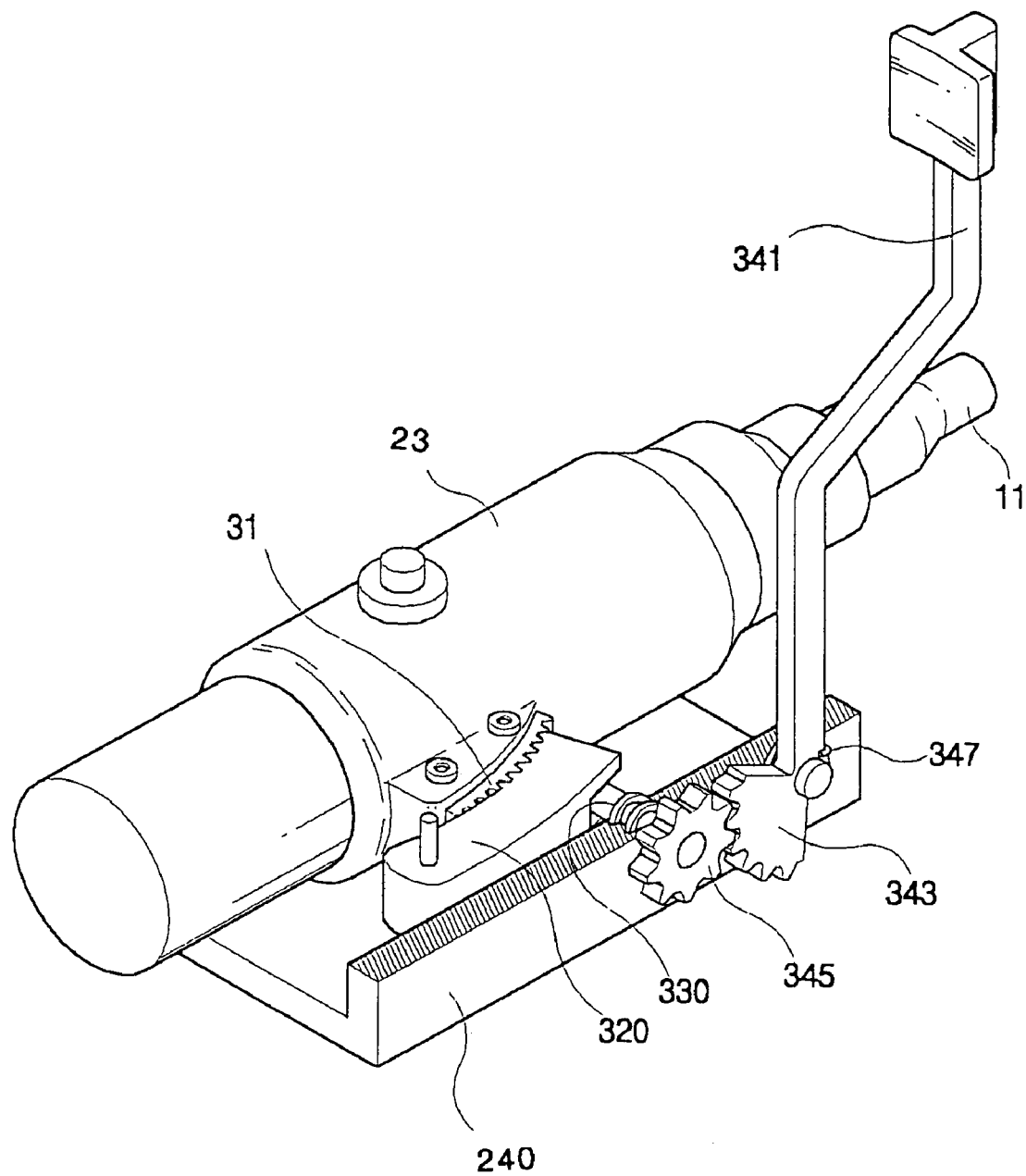

US 7,083,198 B2

TILT STEERING APPARATUS FOR VEHICLE

The present disclosure is related to the prior foreign application No. 10-2003-38732 filed on 16 Jun. 2003 in Republic of Korea (KR).

BACKGROUND OF THE INVENTION

1. Field of the Invention

The present invention relates to a tilt steering apparatus for a vehicle, mounted with a tilt lock mechanism capable of adjusting the height of the steering wheel of the vehicle according to the physical figure (physique) or driving posture of a driver.

2. Description of the Related Art

A tilt steering apparatus mounted with a tilt lock mechanism is disclosed in a number of publications, for example, U.S. Pat. Nos. 6,481,310, 6,282,977, 5,452,624, 5,143,402, 5,078,022, 4,903,540, and 4,892,330; Japanese Patent Publications Nos. 2000-272524, 1999-268654, 1999-208483, 1999-198819, 1999-129914, 1998-138934, 1996-230687; and Japanese Utility Model Publications Nos. 1994-1110, 1991-112468, 1989-51567, 1988-52666, 1988-12470, 1985-144569, and 1982-142677.

The tilt lock mechanism introduced in the above publications is composed of a fixed gear, a movable gear, a wedge member (or lock slider) and a reaction member, which are sequentially disposed perpendicular to an operating plane of the movable gear. In particular, the tilt lock mechanism mounted on the steering apparatus discussed in U.S. Pat. No. 628,977, as shown in FIGS. 1 and 2, is composed of a fixed gear 31, a movable gear 32 upon the fixed gear 31, a wedge member 33 disposed at the lower portion of the movable gear 32 in such a manner to be able to slide, and a reaction member 35 for supporting a bottom surface of the wedge member 33.

With the help of such tilt lock mechanism, the movable gear 32 is locked or released as follows. Referring to FIG. 1 first, if a tilt lever 34b is rotated clockwise, a protruded portion 32b of the wedge member 33 correspondingly slides to the right side, and the movable gear 32 is released from the tooth coupling to the fixed gear 31. When the lock is released, an upper column member 15 is tilted with respect to a lower column member 15 so as to set the steering wheel at an appropriate height. On the other hand, if the tilt lever 34b is freed, the tilt lever 34b is rotated counter-clockwise by a spring 30, and the wedge member 33 slides to the left side, sliding in-between the movable gear 32 and the reaction member 35, and pushes the movable gear 32 up to be toothed on the fixed gear 31. In this way, the height of the steering wheel can be adjusted as desired.

However, according to the related art tilt steering apparatus, because the protruded portion on the lower end of the wedge member 33 is too little, a heavy load is often placed on the wedge member 33 for breaking the movable away from the fixed gear. This is actually the major cause of changes in operational load or overload on the tilt lever for lock release. As a result, the operability of the tilt lever is substantially lowered.

As an attempt to improve the operability of the tilt lever, U.S. Pat. No. 5,078,022 disclosed a modified tilt lock mechanism as illustrated in FIGS. 3 and 4. In case of the tilt steering apparatus in this disclosure, when a follower gear 34' of a follower teeth 35' engageable with the driving teeth 37' formed on the end of the tilt lever 26' rotates a shaft 28', a movable gear 12' is pushed up by the rotation of an eccentric cam portion 31' formed on the shaft 28', and engaged with a fixed gear 9'.

However, because this eccentric cam portion 31' releases the lock by pressing the movable gear 12', the movable gear 12' is easily abraded by the rotation of the eccentric cam portion 31'. As a result thereof, the movable gear 12' is not perfectly locked or toothed on the fixed gear 9'.

Moreover, the movable gear 12' is locked or released from the fixed gear 9' along the circular arc of a flat surface of the eccentric cam portion 31' or to the opposite direction thereof. Basically, this irregular interval contributes to the operational load or overload on the tilt lever, only resulting in deterioration of tilt lever's operability and generation of noise.

SUMMARY OF THE INVENTION

It is, therefore, an object of the present invention to provide a tilt steering apparatus for a vehicle, capable of securing lock or un-lock, improving operability of a tilt lever, and suppressing noise by employing a tilt lock mechanism which converts a rotational motion to a rectilinear motion.

To achieve the above object, there is provided a tilt steering apparatus for a vehicle, including: a lower steering shaft of which low end being mounted with a steering gear; an upper steering shaft of which top end being mounted with a steering wheel; a universal joint that joints a top end of the lower steering shaft with a low end of the upper steering shaft; a lower column member fixed to a vehicle body to support the lower steering shaft to be movable; an upper column member that supports the upper steering shaft to be movable; and a tilt lock mechanism that tilt-locks the upper column member to the lower column member, wherein the tilt lock mechanism includes a fixed gear attached to the lower column member; a movable gear attached to the upper column member in such a manner to be movable; a female screw attached to the upper column member; a feed screw bar locked to the female screw to tooth-lock the movable gear to the fixed gear by pressing the movable gear; and an operating member that rotates the feed screw bar.

The tilt lock mechanism is capable of converting the rotational motion to the rectilinear motion, whereby locking or unlocking (releasing the lock) is more completely performed, and the operability of the tilt lever can be improved, and noise from the operation is well suppressed.

In this embodiment, the movable gear comprises a concave groove and an opening portion whose width is smaller than that of the concave groove, being and is interconnected with the concave groove; and the feed screw bar comprises a flange to be inserted in the concave groove, and a connecting portion that connects the flange to the feed screw bar while being disposed at the opening portion.

Preferably, the operating member comprises a tilt lever attached to the upper column member in such a manner to be movable, a driving gear attached to one end of the tilt lever, and a driven gear fixed to the feed screw bar, and toothed to the driving gear.

Preferably, the apparatus further includes a torsion coil spring, of which one end being attached to the upper column member and the other being attached to the tilt lever.

Another aspect of the present invention provides a tilt steering apparatus for a vehicle, including: a lower steering shaft of which low end being mounted with a steering gear; an upper steering shaft of which top end being mounted with a steering wheel; a universal joint that joints a top end of the lower steering shaft with a low end of the upper steering shaft; a lower column member fixed to a vehicle body that supports the lower steering shaft to be movable; an upper column member that supports the upper steering shaft to be movable; and a tilt lock mechanism that tilt-locks the upper column member to the lower column member, wherein the tilt lock mechanism includes a fixed gear attached to the upper column member; a movable gear attached to the lower column member in such a manner to be movable; a female screw attached to the lower column member; a feed screw bar locked to the female screw that tooth-locks the movable gear to the fixed gear by pressing the movable gear; and an operating member that rotates the feed screw bar.

BRIEF DESCRIPTION OF THE DRAWINGS

The above objects, features and advantages of the present invention will become more apparent from the following detailed description when taken in conjunction with the accompanying drawings, in which:

FIG. 1 is a side cross-sectional view of a tilt steering apparatus in a related art;

FIG. 2 is a bottom view of the tilt steering apparatus in FIG. 1;

FIG. 3 is a side view of another tilt steering apparatus in the related art;

FIG. 4 is a cross-sectional view of the tilt steering apparatus, taken along line 6–6' of FIG. 3

FIG. 5 is a perspective view of an outside of a tilt steering apparatus in accordance with a preferred embodiment of the present invention;

FIG. 6 is a perspective view of the tilt steering apparatus, in which a movable gear is locked in a fixed gear;

FIG. 7 is a perspective view of the tilt steering apparatus, in which the movable gear is released from the fixed gear;

FIG. 8 is a perspective view showing major discrete parts of a tilt lock mechanism; and FIG. 9 is a perspective view of a tilt steering apparatus in accordance with another preferred embodiment of the present invention.

DETAILED DESCRIPTION OF THE PREFERRED EMBODIMENT

A preferred embodiment of the present invention will be described herein below with reference to the accompanying drawings. Like reference numerals designate like parts in the related art. In the following description, well-known functions or constructions are not described in detail since they would obscure the invention in unnecessary detail.

In DETAILED DESCRIPTION and CLAIMS, directions, e.g. vertical, horizontal, back and forth etc., will be determined based on a driver who actually operates a steering wheel. For instance, in FIG. 5, the right side is designated as 'top' or 'upper', the left side as 'bottom' or 'lower', the upper side as 'fore' or 'front', the lower side as 'back', the visible side as 'left' and the invisible side as 'right'.

Preferred Embodiment 1

FIG. 5 is a perspective view of an outside of a tilt steering apparatus in accordance with a preferred embodiment of the present invention; FIG. 6 is a perspective view of the tilt steering apparatus, in which a movable gear is locked in a fixed gear; FIG. 7 is a perspective view of the tilt steering apparatus, in which the movable gear is released from the fixed gear; and FIG. 8 is a perspective view showing major discrete parts of a tilt lock mechanism.

As depicted in FIGS. 5 through 8, the tilt steering apparatus 100 of the present invention is composed of an upper steering shaft 11, a lower steering shaft 12, a universal joint 13, an upper column member 140, a lower column member 15, and a tilt lock mechanism 160, each of the components serving to transfer the behavior (or motion) of a steering wheel (not shown) in a vehicle to wheels (not shown).

Particularly, the upper steering shaft 11 is used for mounting the steering wheel (not shown) on a steering wheel mounting portion 11a. In addition, the universal joint 13 is mounted on the lower end of the upper steering shaft 11 (refer to FIG. 1). On the top and bottom portions of the upper steering shaft 11 are bearings 21 and 22 to be inserted between the upper column member 140 and the upper steering shaft 11.

A steering gear (not shown) is fixed to the lower end of the lower steering shaft 12. For example, in case of a Rack pinion type steering apparatus, a steering rack is toothed to the steering gear. The steering rack is again coupled to the wheels through tie rod, ball joint, knuckle arm and the like. Connected to the top end portion of the lower steering shaft 12 is the universal joint. The lower steering shaft 12 is movable to every direction with the help of the bearing (not shown) inserted between the lower column member 15 and the lower steering shaft 12.

The universal joint 13, as illustrated in FIG. 1, is inserted between the lower end of the upper steering shaft 11 and the upper end of the lower steering shaft 12, making both steering shafts 11 and 12 be flexibly connected to each other. Thanks to this universal joint, the rotation of the upper steering shaft 11 following the rotation of the steering wheel is readily transferred to the lower steering shaft 12, even when a core 11b of the upper steering shaft 11 and a core 12b of the lower steering shaft 12 are dislocated from each other, that is, when the core 11b of the upper steering shaft 11 is inclined to the core 12b of the lower steering shaft 12. Here, a straight line passing through the cross point of those two cores 11b and 12b is designated as the center 13b of the universal joint 13, and this center 13b corresponds to a core 25a of the tilt shaft 25.

The upper column member 140 is composed of a cylindrical column main body 23, and an upper bracket 240 fixed to the lower end of the column main body 23. A through hole 241 is punched to both sides of the upper bracket 240, respectively, and the tilt shaft 25 is embedded in the through hole 241. The core 25a of the tilt shaft 25 passes through the center 13b of the universal joint 13. A hole is also formed on both sides of the upper bracket 140, respectively. In this hole, a pin 26, on which a movable gear 320 (this will be described later) is pivoted, is embedded. In fact, this pin 26 is part of a tilt lock mechanism 160 which will be described later. As viewed in FIG. 8, a female screw 250, another component of the tilt lock mechanism 160, is formed on the rear side of the upper bracket 240. The entire upper column member 140 supports the rotation of the upper steering shaft 11 with the help of bearings 21 and 22, each being inserted between the top end of the column main body 23 and the upper steering shaft 11, and between the top end of the upper bracket 240 and the upper steering shaft 11. Further, the entire upper column member 140 is supported by the tilt shaft 25 in such a manner to be able to pivot upon the lower column member 15.

The lower column member 15 is composed of a column main body 28 and a cylindrical portion 29 in one body. The cylindrical portion 29 includes a support portion 29a that supports the cylindrical portion 29 to be inserted in the upper bracket 240. To this end, the tilt shaft 25 is embedded in the support portion 29a. The column main body 28, on the other hand, is fixed to an instrument panel (not shown) of a vehicle through a mounting portion (not shown). The entire lower column member 15, through a bearing (not shown), supports the lower steering shaft 12 to make it pivotably move. Also, the upper column member 140 and the lower column member 15 are interconnected to each other by a spring 106. Because of this spring 106, a spring force is applied to the fore part of the upper column member 140 against the lower column member 15, centering around the tilt shaft 25. This spring force is supposed to facilitate the adjustment of steering wheel's height by offsetting the weights of the upper steering shaft 11, the upper column member 140, and the steering wheel.

Major components of the tilt lock mechanism 160 include a fixed gear 31 attached to the lower column member 15, a movable gear 320 attached to the upper column member 140, a feed screw bar 330, an operating member 340 for rotating the feed screw bar 330, a pin 26, and a female screw 250.

The fixed gear 31 is a block type member fixed to the rear surface of the cylindrical portion 29 by the pin, and a fixed toothed portion 31a is formed on the rear surface of this block 31, making a circular arc around the tilt shaft 25.

The movable gear 320 is another block type member, whose upper end is pivotably movable by the pin 26 that is embedded in the upper column member 140. A movable toothed portion 32a to be engaged with the fixed toothed portion 31a is formed on the front surface of this block 320. On the rear surface of the movable gear 320, there is formed of a concave groove 321 with an opening portion 323 toward the lower end of the movable gear 320, and an opening portion 323 on the rear surface of the concave groove 321 that is interconnected with the concave groove. Preferably, the width left and right direction of the opening portion 323 is smaller than that of the concave groove 321, to form a jaw 321b on the concave groove 321. This jaw 321b forcefully pushes the lower end of the movable gear 320 backward, thereby isolating the movable toothed portion 32a from the fixed toothed portion 31a.

The feed screw bar 330 is engaged with the female screw 250, and its fore end is connected to the rear surface of the movable gear 320 and its rear end is connected to the operating member 340. For instance, if the operating member 340 is at the position as shown in FIGS. 5 and 6, the feed screw bar 330 suppresses the movable gear 320, consequently being locked. On the other hand, if the operating member 340 is pulled up or shifted closer to the steering wheel, as illustrated in FIGS. 7 and 8, a clearance or gap is created between the front end of the feed screw bar 330 and the rear surface of the movable gear 320. In this manner, the movable toothed portion 32a of the movable gear 320 is separated from the fixed toothed portion 31a, and the lock therebetween is released.

To ensure the lock release, a flange 331 is preferably placed at the concave groove 321 on the front end of the feed screw bar 330, and a connecting portion 333 for connecting the flange 331 on the opening portion 323 to the feed screw bar 330 is preferably formed. Having this construction, if the feed screw bar 330 moves downward, the flange 331 pulls down the jaw 321b of the concave groove 321, in order to make sure that the movable toothed portion 32a is completely isolated from the fixed toothed portion 31a. This flange 331 is usually fetched out through a lower opening 321a of the concave groove 321.

The operating member 340 is composed of a tilt lever 341 disposed at the rear side of the upper bracket 240, a driving gear 343 disposed at the right end of the tilt lever 341, and a driven gear 345 toothed to the driving gear 343, being fixed to the rear end of the feed screw bar 330. In particular, the tilt lever 341 is installed in such a manner that it can pivot on the upper bracket 240 by a support axis 341a.

If a torsion coil spring 347 is further included, wherein one end of the coil spring is attached to the upper column member 140 and the other end is attached to the tilt lever 341, the spring force is transferred from the tilt lever 341 to the lock, and it gets much easier to operate the tilt lever.

The operation of the tilt steering apparatus 100 for a vehicle is now explained.

At first, the fixed gear 31 is released from the movable gear 320 when pressed by the feed screw bar 330. That is, if the tilt lever 341 is pulled close to the steering wheel mounting portion 11a, it gets pivoted counter-clockwise upon the support axis 341a. Through this pivoting tilt lever 341, the rotating behavior of the driving gear 343 is transferred to the driven gear 345. The feed screw bar 330 is correspondingly shifted backward as much as the driven gear 345 is rotated. By this retreated feed screw bar 330, the flange 331 pulls the jaw backward and the movable gear 320 pivots down upon the pin 26. In this manner, the fixed toothed portion 31a of the fixed gear 31 and the movable toothed portion 32a of the movable gear 320 are disengaged from each other. Once their lock is released, the upper column member 140 can be tilted toward the lower column member 14, and it gets much easier to adjust the height of the steering wheel.

When the tilt lever 341 is released after the steering wheel is set at an appropriate height, the tilt lever is rotated clockwise by the torsion coil spring 347. Similar to the tilt lock release, the rotation force is transferred to the driven gear 345 through the driving gear 343, shifting the feed screw bar 330 forward. Therefore, the flange 331 pushes the movable gear 320 forward. In this way, the fixed gear 31 and the movable gear 320 are toothed to each other, being tilt locked. In this state, the upper column member 140 is locked to the lower column member 15, and the adjustment of the steering wheel's height is completed.

To be short, in case of the tilt steering apparatus for a vehicle with the above construction and operation, although the tilt lock mechanism 160 and the feed screw bar 330 are designed to be shifted back and forth, they play a key role in converting the rotational motion to the rectilinear motion. Thus, the operability of the tilt lever can be enhanced despite any possible change in operational load or overload on the tilt lever when the tilt is released.

Besides, since the tilt lock and lock release are done by the feed screw bar's consecutive motions, the noise generated from the operation can be suppressed as much as possible. Although it is possible that the screw thread of the feed screw bar 330 is worn out, the movable gear 320 can be pushed up fully and completely.

Preferred Embodiment 2

In case of the Exemplary Embodiment 1, the fixed gear 31 was mounted on the lower column member 15, and the movable gear 320 was mounted on the upper column member 140. In the present embodiment, however, the movable gear 320 is mounted on the upper bracket 240, and the fixed gear 31 is mounted on the column main body 23. This manifests that the positions of the fixed gear 31 and the movable gear 320 do not necessarily affect the operation of the tilt steering apparatus itself.

In conclusion, the tilt steering apparatus for a vehicle according to the present invention can be advantageously used for the following reasons.

First, as a tilt lock mechanism for tilt locking an upper column member to a lower column member is constructed of a fixed gear mounted on the lower column member, a pivotably movable gear mounted on the upper column member, a female screw attached to the upper column member, a feed screw bar engaged with the female screw for locking the movable gear to the fixed gear by pressing the movable gear, and an operating member for rotating the feed screw bar, it is possible to convert the rotational motion to the rectilinear motion, whereby the operability of the tilt lever can be improved despite any possible change in operational load or overload on the tilt lever when the tilt is released. Also, since the tilt lock and lock release are done by the feed screw bar's consecutive motions, the noise generated from the operation can be suppressed as much as possible. Although it is possible that the screw thread of the feed screw bar 330 is worn out, the movable gear 320 can be pushed up fully and completely.

Second, the movable gear is composed of a concave groove and an opening portion whose width is smaller than that of the concave groove, being interconnected with the concave groove, and the feed screw bar is composed of a flange to be inserted in the concave groove, and a connecting portion for connecting the flange to the feed screw bar while being disposed at the opening portion. In this manner, only one single feed screw bar is sufficient to manage to lock or unlock the movable gear.

Third, because the operating member is composed of a pivotably movable tilt lever, a driving gear attached to one end of the tilt lever, and a driven gear attached to the feed screw bar, being engaged with the driving gear, the operability of the tilt lever is much more enhanced.

Fourth, adding a torsion coil spring, whose one end being attached to the upper column member and the other end being attached to the tilt lever, one can more easily lock the movable gear.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A tilt steering apparatus for a vehicle, comprising:
   a lower steering shaft, a steering gear mounted to a lower end portion of the lower steering shaft;
   an upper steering shaft, a steering wheel mounted to a top end portion of the upper steering shaft;
   a universal joint that joins a top end portion of the lower steering shaft with a lower end portion of the upper steering shaft;
   a lower column member fixed to a vehicle body and configured to movably support the lower steering shaft;
   an upper column member that moveably supports the upper steering shaft; and
   a tilt lock mechanism that tilt-locks the upper column member to the lower column member, the title lock mechanism comprising:
   a fixed gear attached to the lower column member;
   a movable gear attached to the upper column member so as to be movable;
   a female screw provided on the upper column member;
   a feed screw bar engaged with the female screw to lock the movable gear to the fixed gear by pressing the movable gear; and
   an operating member that rotates the feed screw bar.

2. The apparatus according to claim 1, wherein the movable gear comprises a concave groove and an opening portion, a width of the opening portion being smaller than a width of the concave groove, the opening portion being interconnected with the concave groove; and the feed screw bar comprises a flange configured to be inserted in the concave groove, and a connection portion that connects the flange to the feed screw bar while being disposed at the opening portion.

3. The apparatus according to claim 2, wherein the operating member comprises a tilt lever attached to the upper column member in such a manner to be movable, a driving gear attached to one end of the tilt lever, and a driven gear fixed to the feed screw bar, and geared to the driving gear.

4. The apparatus according to claim 3, further comprising:
   a torsion coil spring, one end of the torsion coil spring attached to the upper column member and the other end of the torsion attached to the tilt lever.

5. The apparatus according to claim 1, wherein the operating member comprises a tilt lever attached to the upper column member so as to be movable, a driving gear attached to one end of the tilt lever, and a driven gear fixed to the feed screw bar, and engaged with the driving gear.

6. The apparatus according to claim 5, further comprising:
   a torsion coil spring, one end of the torsion coil spring being attached to the upper column member and an other end of the torsion coil spring begin attached to the tilt lever.

7. The apparatus according to claim 1, wherein an upper end of the movable gear is pivotally fixed to the upper column member.

8. The apparatus according to claim 1, wherein a lower end of the movable gear is pivotally fixed to the upper column member.

* * * * *